June 12, 1934.  A. H. LEAK  1,962,246
MULTIPLE MASTER CONNECTING ROD ASSEMBLY
Filed June 8, 1931   3 Sheets-Sheet 2
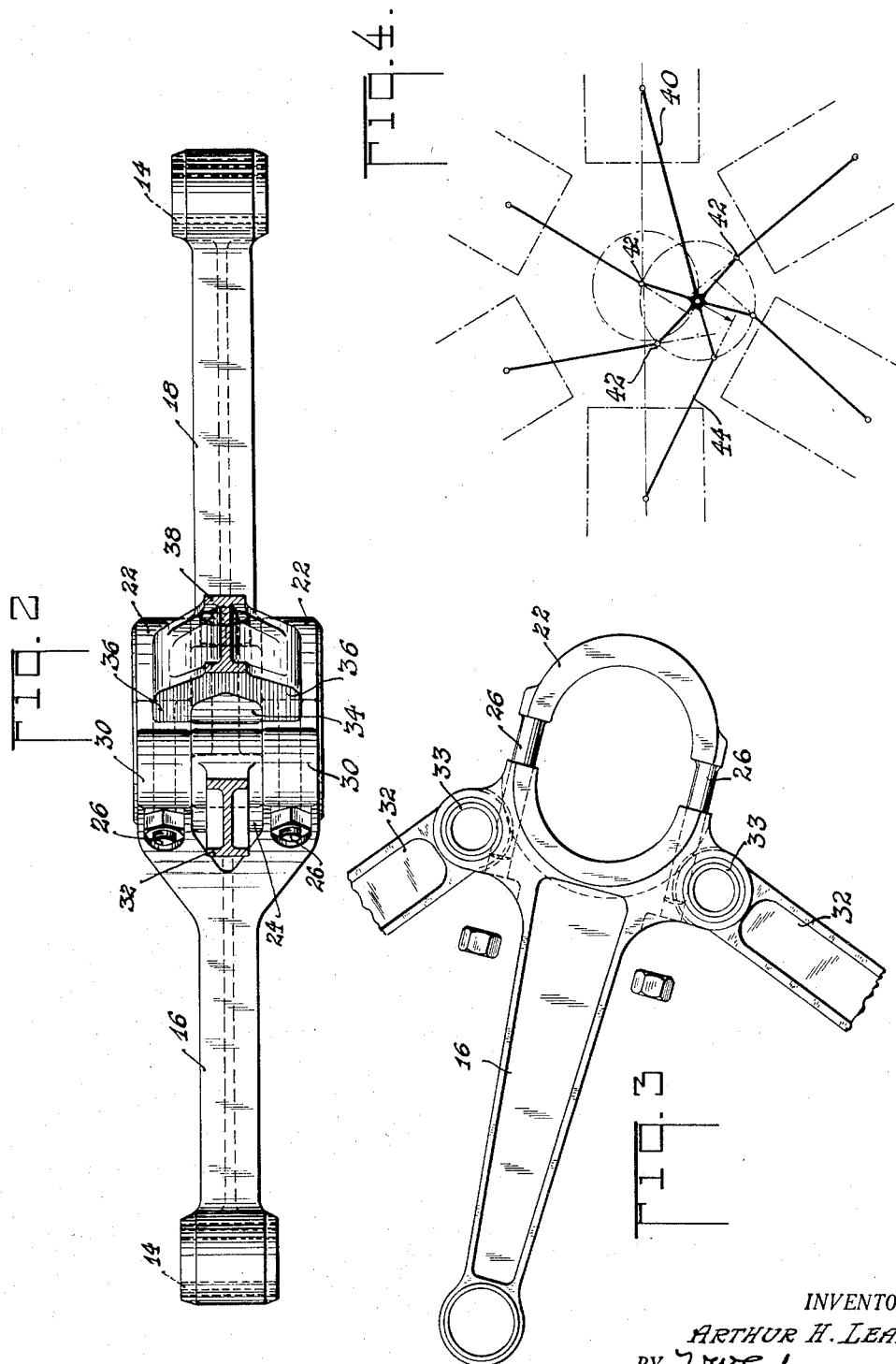
INVENTOR.
ARTHUR H. LEAK
BY
ATTORNEYS.

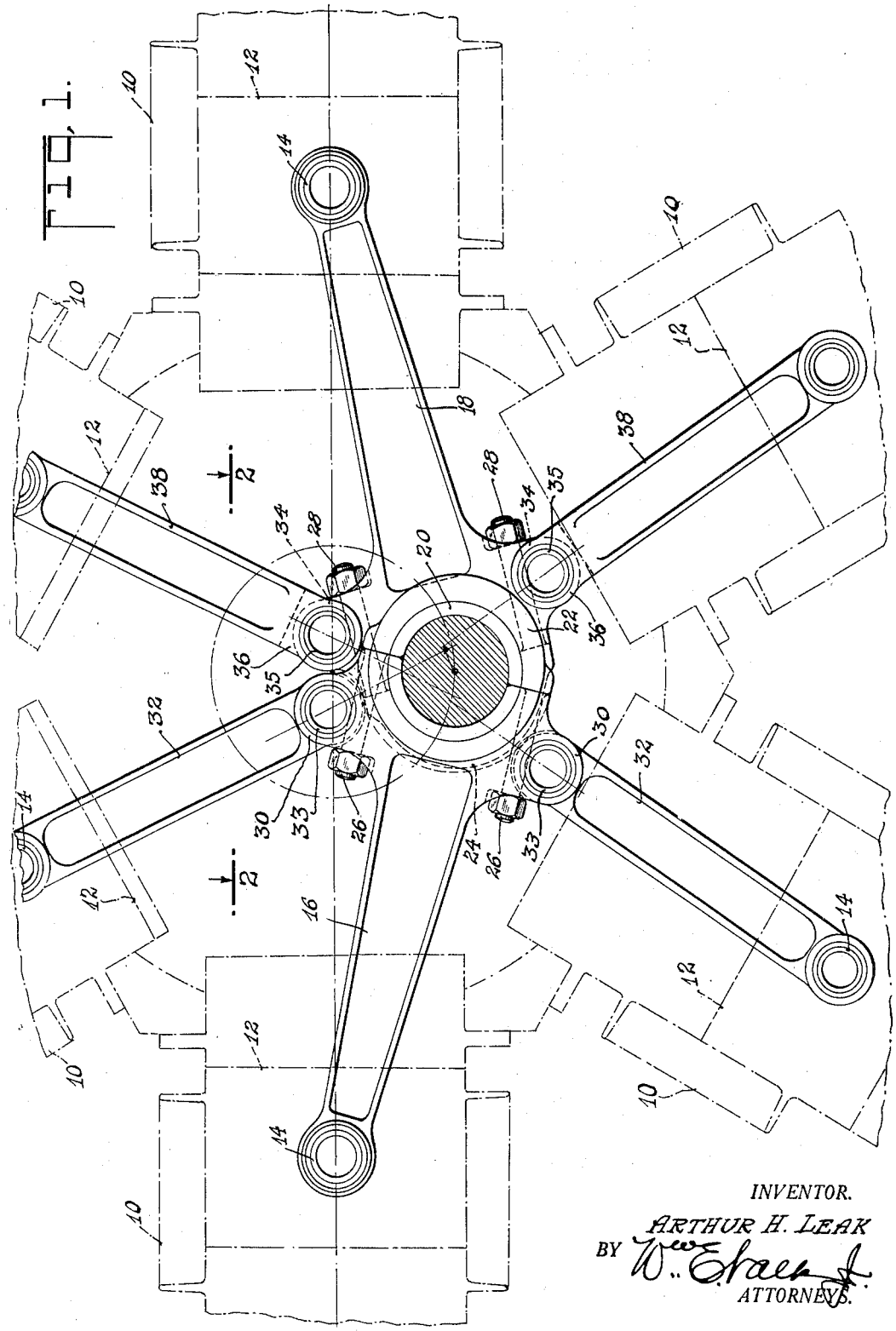

June 12, 1934.  A. H. LEAK  1,962,246
MULTIPLE MASTER CONNECTING ROD ASSEMBLY
Filed June 8, 1931  3 Sheets-Sheet 3
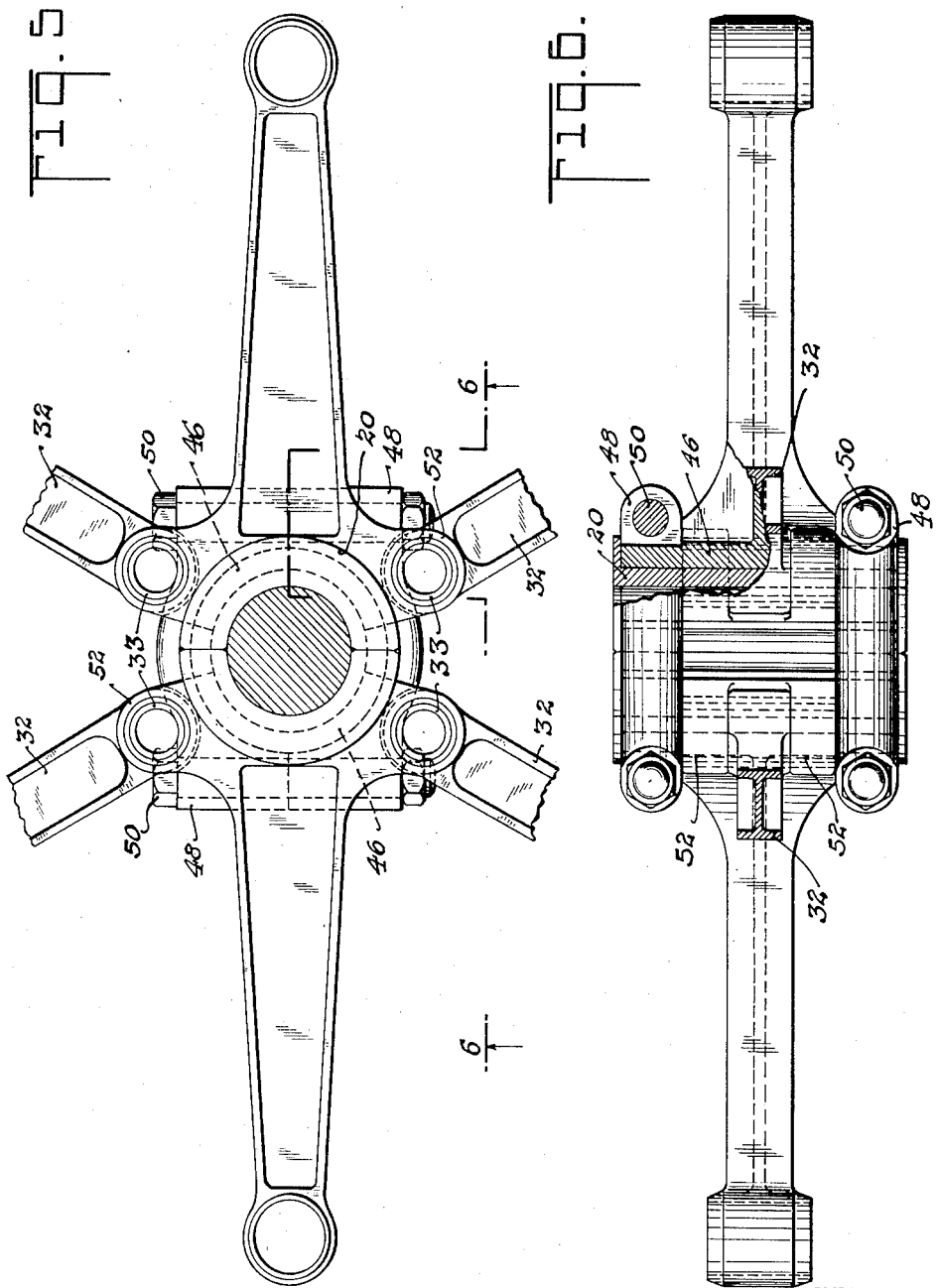
INVENTOR.
ARTHUR H. LEAK
BY
ATTORNEYS.

Patented June 12, 1934

1,962,246

UNITED STATES PATENT OFFICE 1,962,246

MULTIPLE MASTER CONNECTING ROD ASSEMBLY

Arthur H. Leak, Hamburg, N. Y., assignor to Wright Aeronautical Corporation, a corporation of New York Application June 8, 1931, Serial No. 542,814

2 Claims. (Cl. 74—17)

This invention relates to improvements in connecting rods for engines having radially disposed cylinders. In such engines one cylinder only is usually served by a main or master rod having knuckle pins spaced around its crankpin end on which "auxiliary" rods serving the other cylinders are articulated.

Due to the angular swing of the master rod, the knuckle pins describe elliptical paths so that the strokes of the auxiliary rods are distorted and their angularity increased, whereby the balance of the engine is upset and the side reactions on the pistons, and particularly on the master rod piston, are increased. These effects are slight for the cylinders adjacent the one associated with the master rod but are of considerable magnitude in the opposite cylinders, and the prime objects of this invention are to overcome these larger errors in the rod motions.

Accordingly, in this invention a plurality of master rods are used, each having knuckle pins on the shank side of the crankpin end only, whereby the knuckle pins which develop the objectionable ellipticity in the rod motion are eliminated.

In the drawings, wherein like reference characters denote like or corresponding parts, Fig. 1 is a side elevation of the connecting rod assemblage of this invention with the crankpin shown in section;

Fig. 2 is a plan view, in section on the line 2—2 of Fig. 1;

Fig. 3 is a partly disassembled view showing one of the master rods;

Fig. 4 is a diagram illustrating the conventional radial connecting rod arrangement;

Fig. 5 is an elevation of an alternative embodiment of the invention, and

Fig. 6 is a plan view (partly in section) on the line 6—6 of Fig. 5.

Referring first to Fig. 1, 10 represents the cylinders, shown dotted, of a radial engine in this specific instance shown as having six cylinders. Each cylinder has a piston, shown dotted at 12, equipped with a wrist pin 14 engaging the outer end of each connecting rod. There are two master rods 16 and 18, the former being forked or straddled around the latter at the crankpin end where both engage the bushing 20. The forked master rod 16 is equipped with two caps 22 and the blade master rod 18 is equipped with a cap 24, the caps being secured to the associated rods by the bolts 26 and 28 in this instance shown as integral with the caps. The forked master rod 16 is equipped with two bosses 30 on each fork, between which are engaged the inner ends of the auxiliary rods 32 on the knuckle pins 33, while the blade master rod 18 is equipped with two bosses 34 over which are straddled the forked ends 36 of the auxiliary rods 38 on the knuckle pins 35.

Referring now to the diagram Fig. 4, which shows the conventional single master rod arrangement, 40 represents a conventional master rod carrying the knuckle pins 42 of all the auxiliary rods. This diagram is drawn to approximately one-half the scale of Fig. 1 and it will be noticed that the angularity of the auxiliary rods is greatest on the side opposite to the master rod 40. Thus when the center line of the rod 44 is produced, it fails to pass thru the center of the crankpin by a relatively large distance and the side reactions generated on the master rod piston are proportionate to this distance. By comparing with Fig. 1, it will be seen that the maximum offset is there very much less, thereby reducing piston side pressures and also the errors in balance. It will be clear that this result follows the use of the double master rods wherein there are no knuckle pins on the side remote from the shank.

Referring now to Figs. 5 and 6, the provisions of this invention are carried out in conjunction with an alternative construction for the master rod. In this case the master rods are similar, each having an arcuate foot 46 engaging the bushing 20 and held from separation by the rings 48 engaging the outer arcuate surface of the foot. In this instance the rings are shown as fabricated in halves for purposes of assembly, the halves being secured together by the bolts 50. Each master rod is provided with bosses 52 between which are engaged the eyes of the auxiliary rods 32 articulating on the knuckle pins 33.

It will be clear that this invention may be used with any known type of master rod construction whereby more than one master rod may engage the crankpin for rotation about the true center thereof.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. In a radial cylinder engine, in combination, a crankpin, a blade master rod adapted to bear on said crankpin and having a bearing cap attached thereto for encircling said pin, bosses formed on said rod adjacent the bearing, forked secondary rods each articulated to and straddling one of said bosses, a forked master rod adapted to bear on said crankpin and to straddle the bearing end of said blade master rod, a pair of bearing caps attached to the ends of said forked master rod encircling said pin, pairs of spaced bosses formed on opposite sides of said forked master rod adjacent its bearing end, and blade secondary rods each articulated to and straddled by one of said pairs of bosses.

2. In a radial cylinder engine, in combination, a crankpin, a master rod having a blade end for engagement with said crankpin, blade bosses formed on said blade end, forked secondary rods articulated to and straddling said blade bosses, a master rod having forked ends straddling said blade end and engaging said crankpin, pairs of oppositely aligned bosses, one boss of each pair being formed on one of said forked ends and the other boss of each pair being formed on the other of said forked ends, and blade secondary rods each articulated to and straddled by one said pair of bosses.

ARTHUR H. LEAK.